US012574313B2

(12) United States Patent
Vasseur et al.

(10) Patent No.: US 12,574,313 B2
(45) Date of Patent: Mar. 10, 2026

(54) PREDICTIVE BGP PEERING

(71) Applicant: Cisco Technology, Inc., San Jose, CA (US)

(72) Inventors: Jean-Philippe Vasseur, Combloux (FR); Eduard Schornig, Haarlem (NL); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 429 days.

(21) Appl. No.: 18/118,769

(22) Filed: Mar. 8, 2023

(65) Prior Publication Data

US 2024/0305553 A1 Sep. 12, 2024

(51) Int. Cl.
*H04L 45/02* (2022.01)
*H04L 43/12* (2022.01)
*H04L 45/302* (2022.01)

(52) U.S. Cl.
CPC .............. *H04L 45/04* (2013.01); *H04L 43/12* (2013.01); *H04L 45/302* (2013.01)

(58) Field of Classification Search
None
See application file for complete search history.

(56) References Cited

U.S. PATENT DOCUMENTS 7,584,298 B2 9/2009 Klinker et al.
8,141,156 B1 3/2012 Mao et al.
10,630,582 B1 4/2020 Deb 2002/0141343 A1* 10/2002 Bays ................... H04L 41/0894
370/235
2006/0056411 A1* 3/2006 Badat ...................... H04L 45/28
370/392
2008/0225713 A1* 9/2008 Tychon ................. H04L 43/091
370/231
2013/0311160 A1* 11/2013 Cowie ................... H04W 40/20
703/13
2016/0179560 A1* 6/2016 Ganguli .............. G06F 11/3006
718/1
2021/0099378 A1* 4/2021 Alaettinoglu ........... H04L 45/70
2022/0086050 A1* 3/2022 Goloubev ............. H04L 41/145

(Continued)

OTHER PUBLICATIONS

Feamster, et al., "A Model of BGP Routing for Network Engineering". SIGMETRICS/Performance'04, Jun. 12-16, 2004, 12 pages, ACM, New York, NY, USA.

*Primary Examiner* — Xavier S Wong
(74) *Attorney, Agent, or Firm* — Lee & Hayes, P.C.

(57) ABSTRACT

In one embodiment, a device determines a mapping between a network destination and Border Gateway Protocol (BGP) peers located across a plurality of autonomous systems for which the network destination is reachable. The device causes, based on the mapping, performance of probing tests along a plurality of paths to the network destination and via the BGP peers, to obtain path performance measurements for the plurality of paths. The device uses a prediction model to generate predicted performance metrics for the plurality of paths based on the path performance measurements. The device configures, based on the predicted performance metrics for the plurality of paths, the BGP peers with BGP peering policies to convey application traffic associated with the network destination via particular path from among the plurality of paths.

20 Claims, 12 Drawing Sheets

(56) References Cited

U.S. PATENT DOCUMENTS

| 2022/0094614 | A1 | 3/2022 | Khurshid et al. |
| 2022/0345394 | A1 | 10/2022 | Vasseur et al. |
| 2024/0205129 | A1* | 6/2024 | Sommers ................ H04L 43/10 |

* cited by examiner

REGIONAL
HUB
304

ISP 3
306d

SaaS PROVIDER
308

ISP 2
306b

MPLS
306c

ISP 1
306a

Int 1

Int 2

Int 3

110

REMOTE
SITE
302

310

900

905

START

910

DETERMINE MAPPING BETWEEN DESTINATION AND BGP PEERS

915

CAUSE PERFORMANCE OF PROBING TESTS

920

USE PREDICTION MODEL TO PREDICT PERFORMANCE METRICS

925

CONFIGURE BGP PEERS

930

END

PREDICTIVE BGP PEERING

TECHNICAL FIELD

The present disclosure relates generally to computer networks, and, more particularly, to predictive Border Gateway Protocol (BGP) peering.

BACKGROUND

The Internet is a hierarchical network of interconnected Internet Service Providers (ISPs) which is used to connect computers, users, and applications across the world. ISPs and other big entities (enterprises, government agencies, research institutions) are represented on the Internet as an autonomous system number (ASN). Peering relationships are created among ASNs using Border Gateway Protocol (BGP) to exchange routing (prefixes) and reachability information.

In general, BGP uses a simplistic objective function to select given path, typically based on the number of traversed autonomous systems (AS). In other words, BGP path selection today does not take into account the performance metrics of the different paths (e.g., in terms of loss, latency, jitter, throughput) that popular online applications such as collaboration tool, gaming, virtual reality (VR), or streaming services may require. This presents challenges to ensuring acceptable application quality of experience (QoE) when the application traffic traverses multiple ASNs and based on a protocol that has no awareness of the underlining network performance.

To help ensure satisfactory application QoE, network administrators today craft sophisticated sets of rules that are expressed as BGP policies applied on peering connections. The policies are carefully designed to manipulate common BGP route attributes (e.g., local preference, multi-exit discriminator, path length) to influence the BGP route selection and avoid paths that are known to traverse poor performing transit circuits or ASNs. However, this also means that a reactive approach is taken with respect to degraded path performance whereby network administrators only take mitigation actions after the performance has degraded and users begin complaining.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
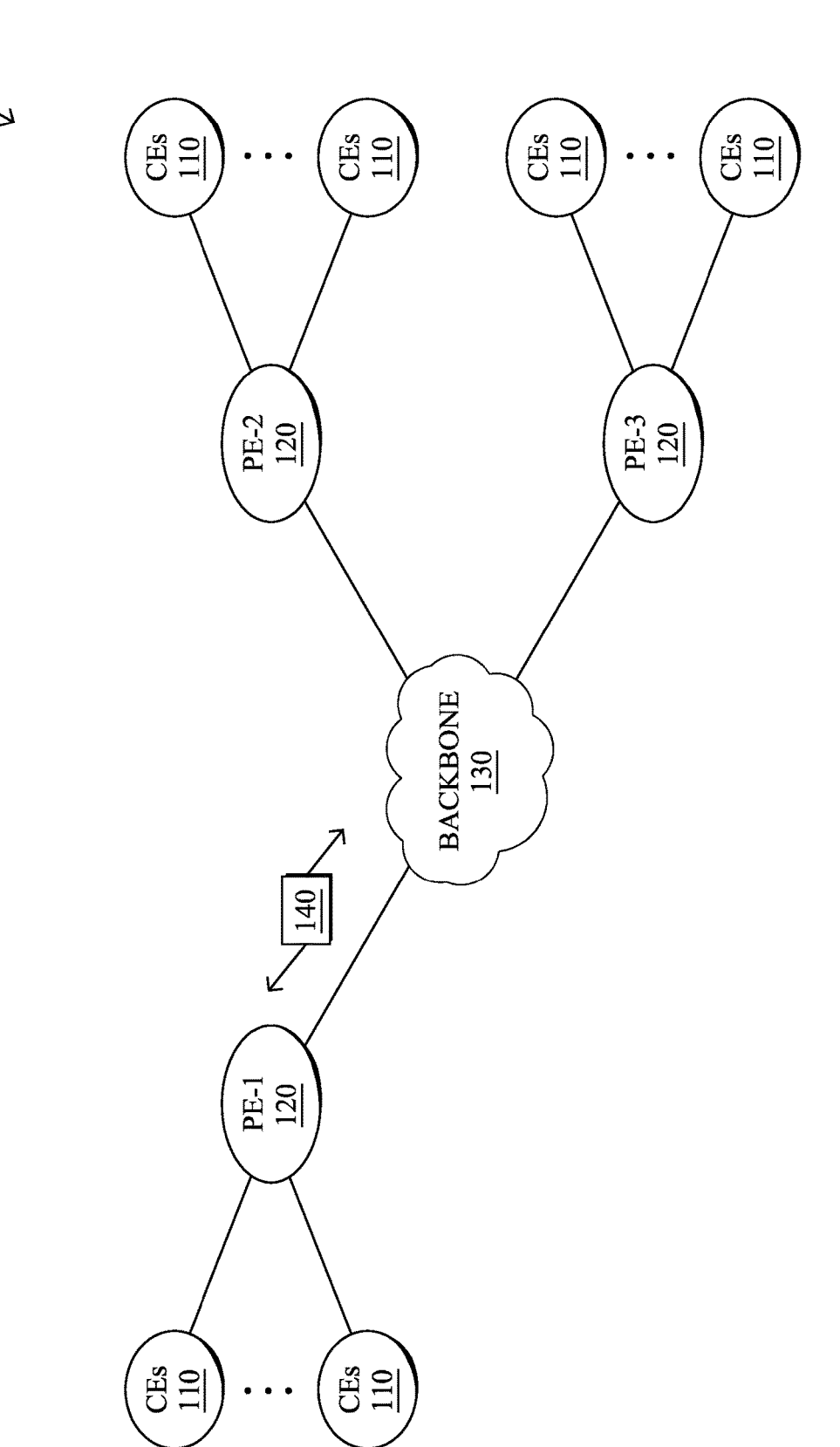
FIGS. 1A-1B illustrate an example communication network.

According to one or more embodiments of the disclosure, a device determines a mapping between a network destination and Border Gateway Protocol (BGP) peers located across a plurality of autonomous systems for which the network destination is reachable. The device causes, based on the mapping, performance of probing tests along a plurality of paths to the network destination and via the BGP peers, to obtain path performance measurements for the plurality of paths. The device uses a prediction model to generate predicted performance metrics for the plurality of paths based on the path performance measurements. The device configures, based on the predicted performance metrics for the plurality of paths, the BGP peers with BGP peering policies to convey application traffic associated with the network destination via particular path from among the plurality of paths.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
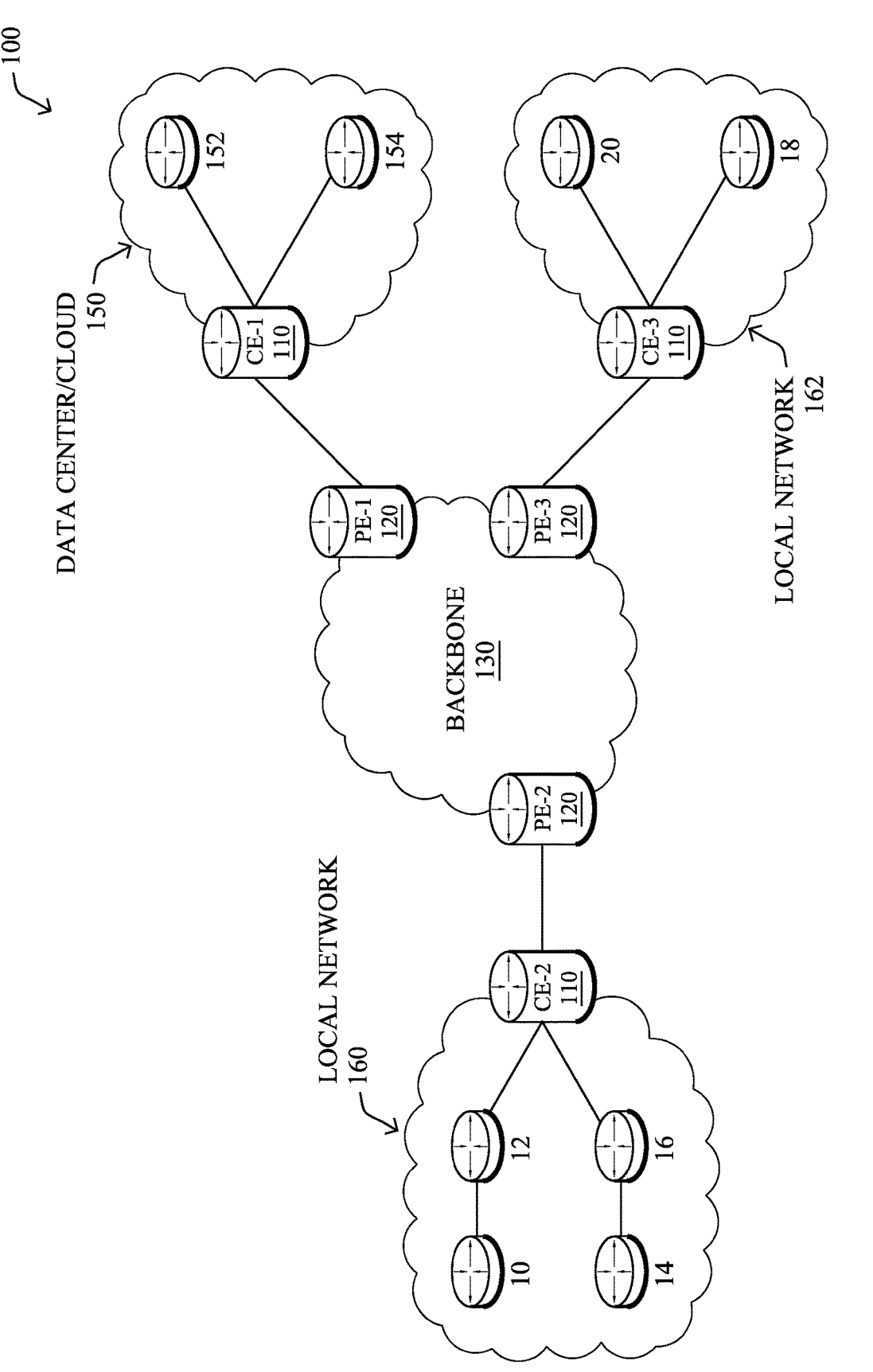

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
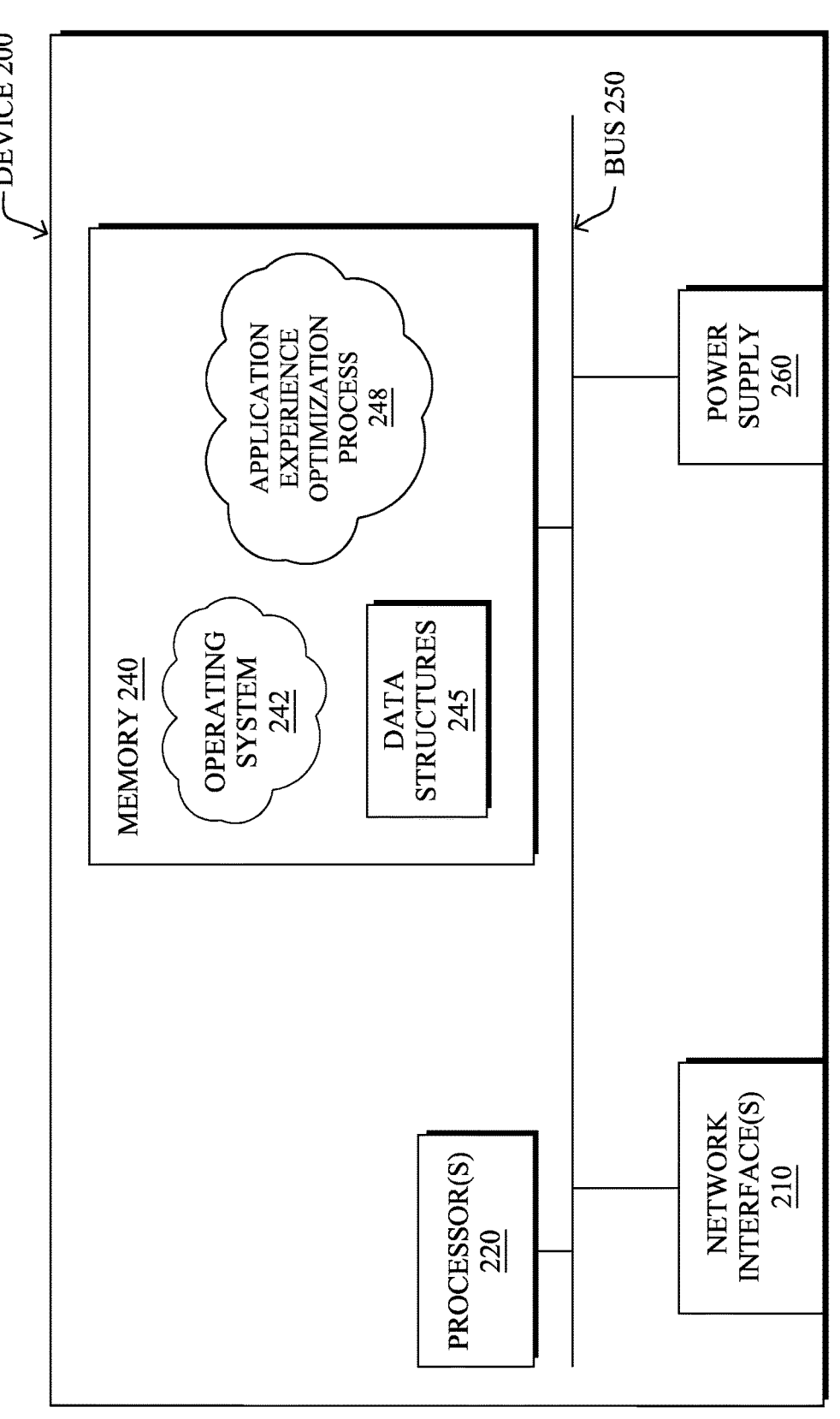
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
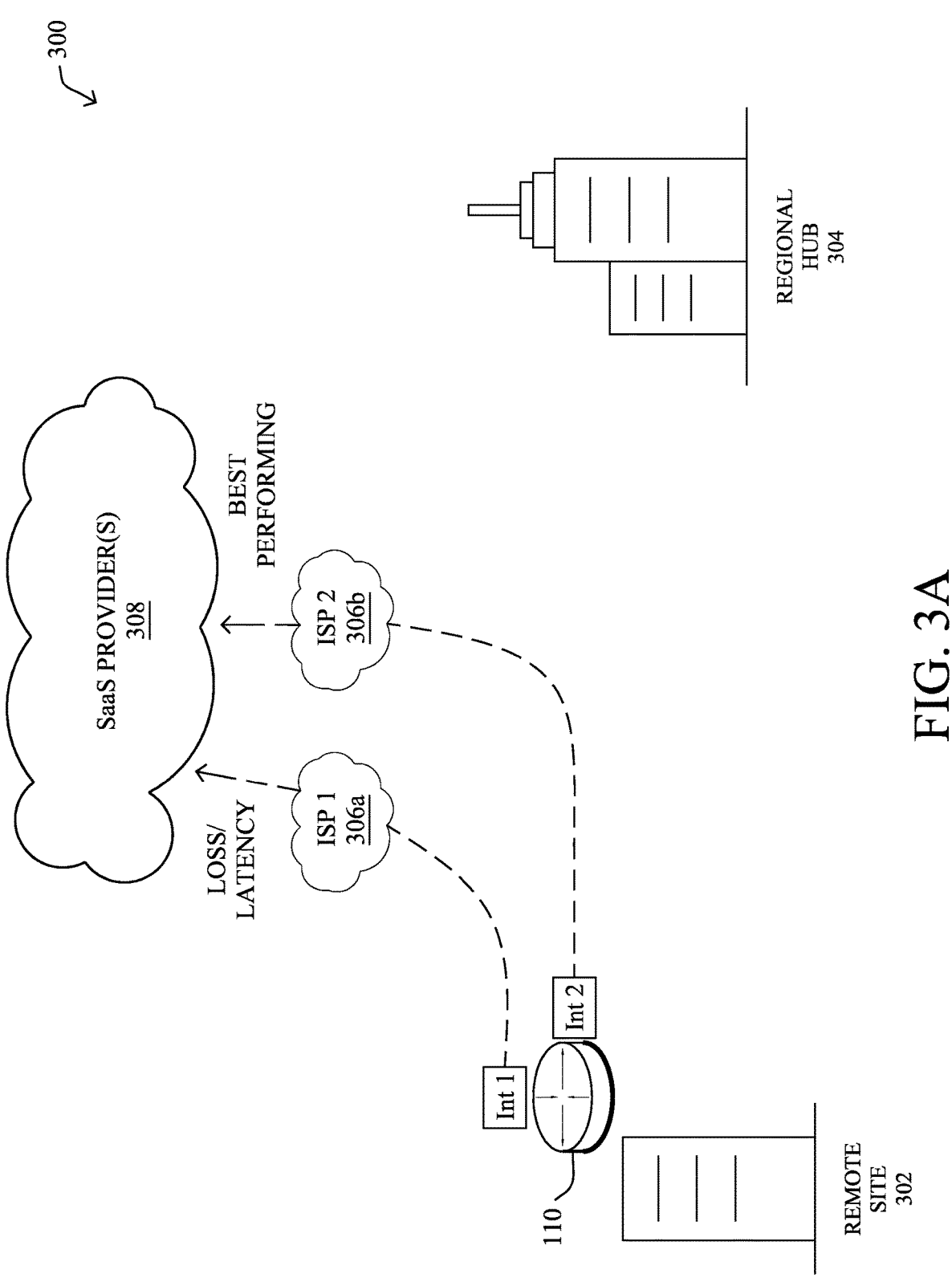
FIGS. 3A-3B illustrate example network deployments.
Figure 3B:
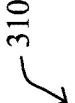

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
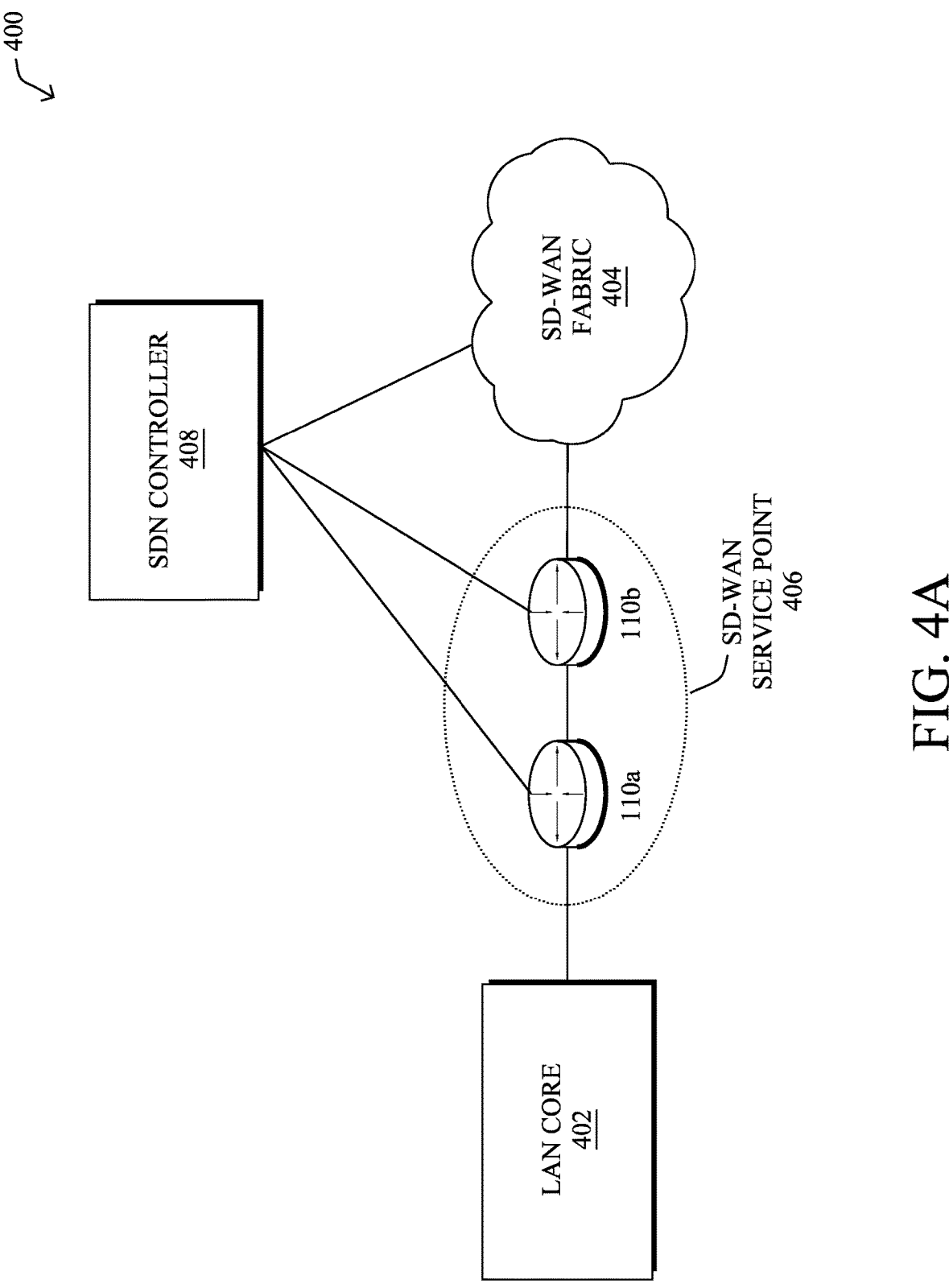
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
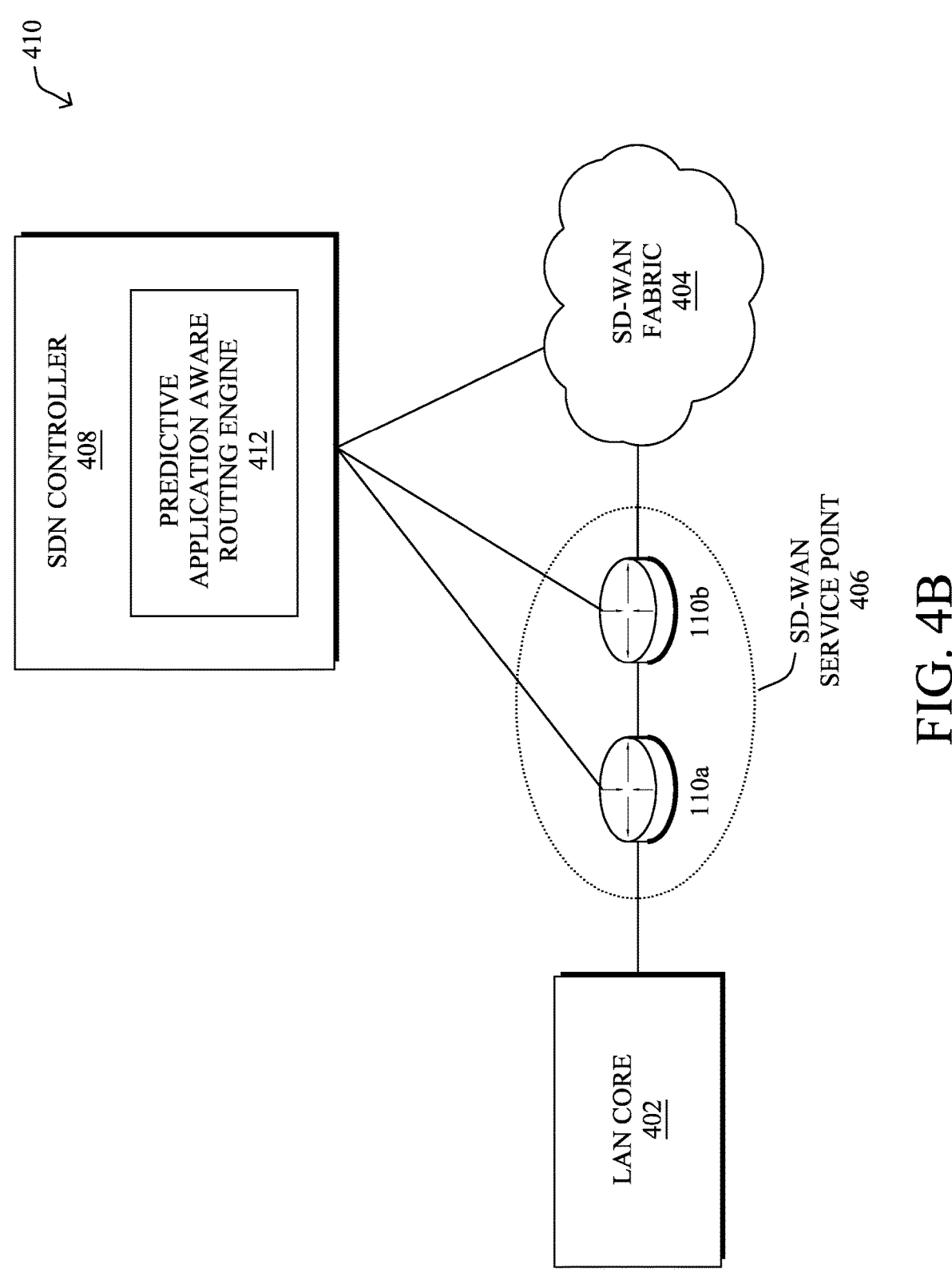

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, the Internet is a hierarchical network of interconnected Internet Service Providers (ISPs) which is used to connect computers, users, and applications across the world. ISPs and other big entities (enterprises, government agencies, research institutions) are represented on the Internet as an autonomous system number (ASN). Peering relationships are created among ASNs using Border Gateway Protocol (BGP) to exchange routing (prefixes) and reachability information.

Figure 5:
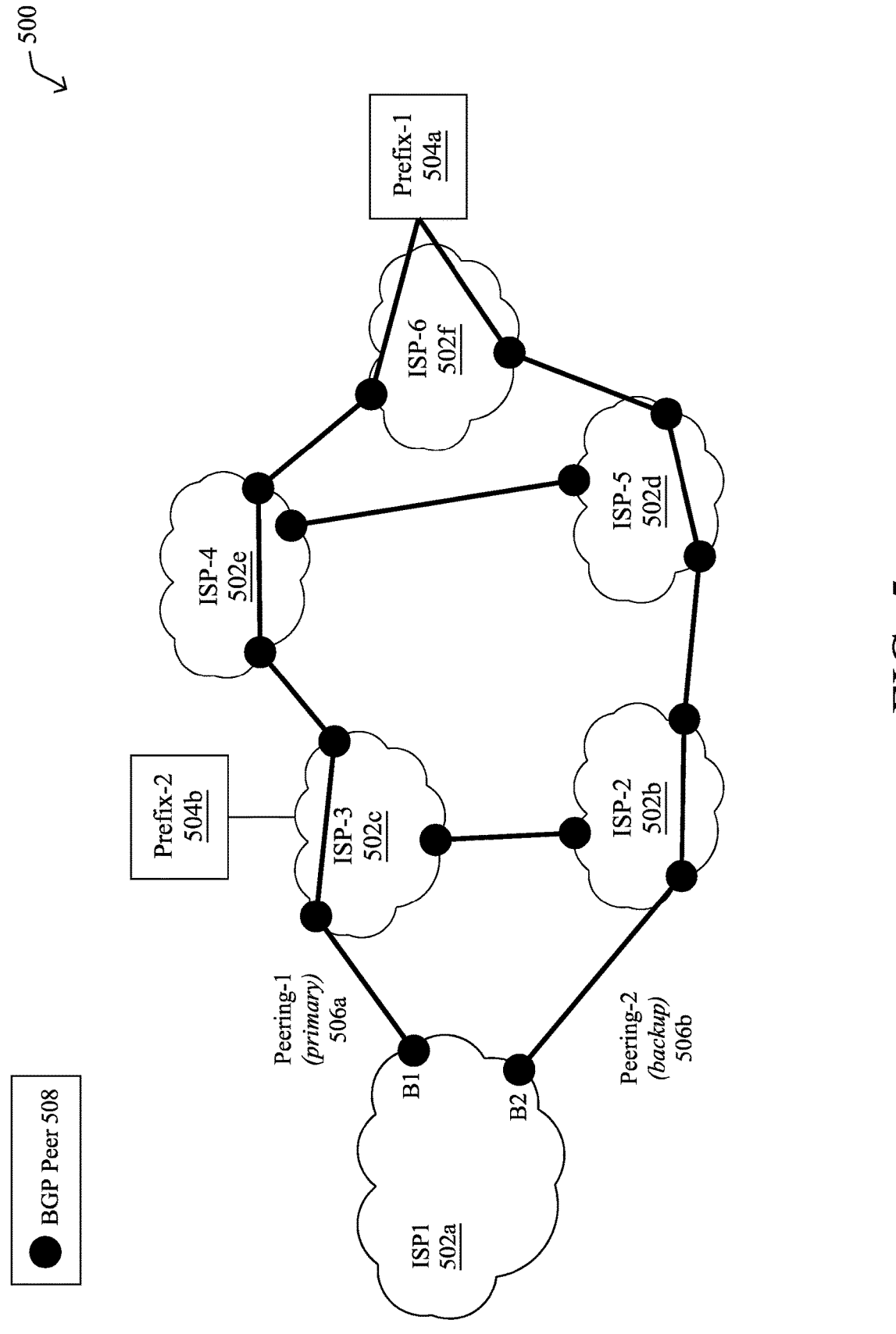
FIG. 5 illustrates an example of Border Gateway Protocol (BGP) peering across ISPs.

By way of example, FIG. 5 illustrates an example 500 of BGP peering across ISPs. As shown, assume that there are a plurality of ISPs 502a-502f that are interconnected with one another and different destinations 504a-504b that are reachable via these interconnections. More specifically, ISP 502a may have two BGP peering connections: one with ISP 502b and another with ISP 502c. Similarly, ISP 502b may have peering connections with ISP 502a, ISP 502c, and ISP 502d. Likewise, ISP 502c may have peering connections with ISP 502a, ISP 502b, and ISP 502e. ISP 502d may have peering connections with ISP 502b, ISP 502e, and ISP 502f. ISP 502e may have peering connections with ISP 502c, ISP 502d, and ISP 502f. Finally, ISP 502f may have peering connections with ISP 502e and ISP 502d. Each such peering connection may be formed between corresponding BGP peers 508 at their respective ISPs.

Now, assume that a client that uses ISP 502a for its Internet access is to connect with destination 504a (e.g., an IP prefix) associated with a particular online application (e.g., Webex, Office 365, etc.). Here, there are actually two potential peering connections that ISP 502a could use to convey such traffic: a first connection from BGP peer B1 in ISP 502a with ISP 502c and a second connection from BGP peer B2 in ISP 502a with ISP 502b. This essentially means that two paths are possible: a first path 506a through the peering connection between B1 and ISP 502c and a second path through the peering connection between B2 and ISP 502b.

With regards to Internet routing, BGP has been deployed at an impressive scale, with close to one million IPv4 prefixes as of today), but the objective metrics for path selection are quite simplistic, mostly based on the number of traversed AS, a metric that does not account for any network performance metrics (e.g., loss, latency, jitter, throughput) that popular applications such as collaboration tool, gaming, virtual reality (VR), or streaming services may require. For instance, based solely on traditional BGP signaling, ISP 502a may utilize path 506a as the primary path to convey application traffic to destination 504a and path 506b as simply a backup path. However, it may very well be the case that path 506b actually offers better performance and using it to convey the application traffic will help to ensure satisfactory application QoE.

Indeed, it is quite challenging to ensure that the application QoE remains high when its traffic often traverses multiple ASNs before reaching its destination. Moreover, doing so based on a protocol that has no awareness of the underlining network performance is not an easy task. To achieve this, network administrators today resort to manually crafting sophisticated sets of rules, expressed as BGP policies, that are applied on peering connections.

Today, the entire BGP tuning process is also reactive in nature whereby new issues are identified based on users complains that can be time consuming~resulting in extended periods of degradation, and heavily relies on the level of expertise of the Network Administrator to implement the appropriate mitigation technique, not mentioning that preserving high coherence across eBGP peers is quite difficult. Manually adjusting BGP policies can also be error prone, with numerous examples of outages in recent history affecting vast swaths of the Internet because of improper BGP policy updates.

A key observation is that the predictive networking techniques herein are not limited to Enterprise networks and can be extended to other networking domains, as well. When applied to the Service Provider (SP) networks, predictive networks systems can be particularly well suited to address the challenges faced by network administrators when trying to optimize network performance or application QoE for traffic traversing the peering infrastructure.

In summary, ISPs operate extensive peering infrastructures to ensure reliable delivery of traffic for destinations outside of their network domains. Today, detecting network performance (loss, latency, jitter, throughput) issues for these remote destinations is reactive in nature and often based on end user complains. Furthermore, troubleshooting and remediation efforts can be complex and time consuming leading to extended impact duration.

Predictive BGP Peering

The techniques introduced herein allow for predictive networking to be extended to BGP peering. To this end, various components are introduced to first discover the available peering points and top destinations of interest (e.g., based on traffic load), dynamically set up monitoring for these destinations and then make use of a predictive network system (PNS) to forecast performance issues in advance. The system may also leverage closed loop automation to act on the predictions and adjust BGP peering policies, as needed. This allows ISPs to manage their peering connections in an automated manner, predict and avoid network performance issues before they happen, and help ensure satisfactory QoE for destinations outside of their networks.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device determines a mapping between a network destination and Border Gateway Protocol (BGP) peers located across a plurality of autonomous systems for which the network destination is reachable. The device causes, based on the mapping, performance of probing tests along a plurality of paths to the network destination and via the BGP peers, to obtain path performance measurements for the plurality of paths. The device uses a prediction model to generate predicted performance metrics for the plurality of paths based on the path performance measurements. The device configures, based on the predicted performance metrics for the plurality of paths, the BGP peers with BGP peering policies to convey application traffic associated with the network destination via particular path from among the plurality of paths.

Figure 6:
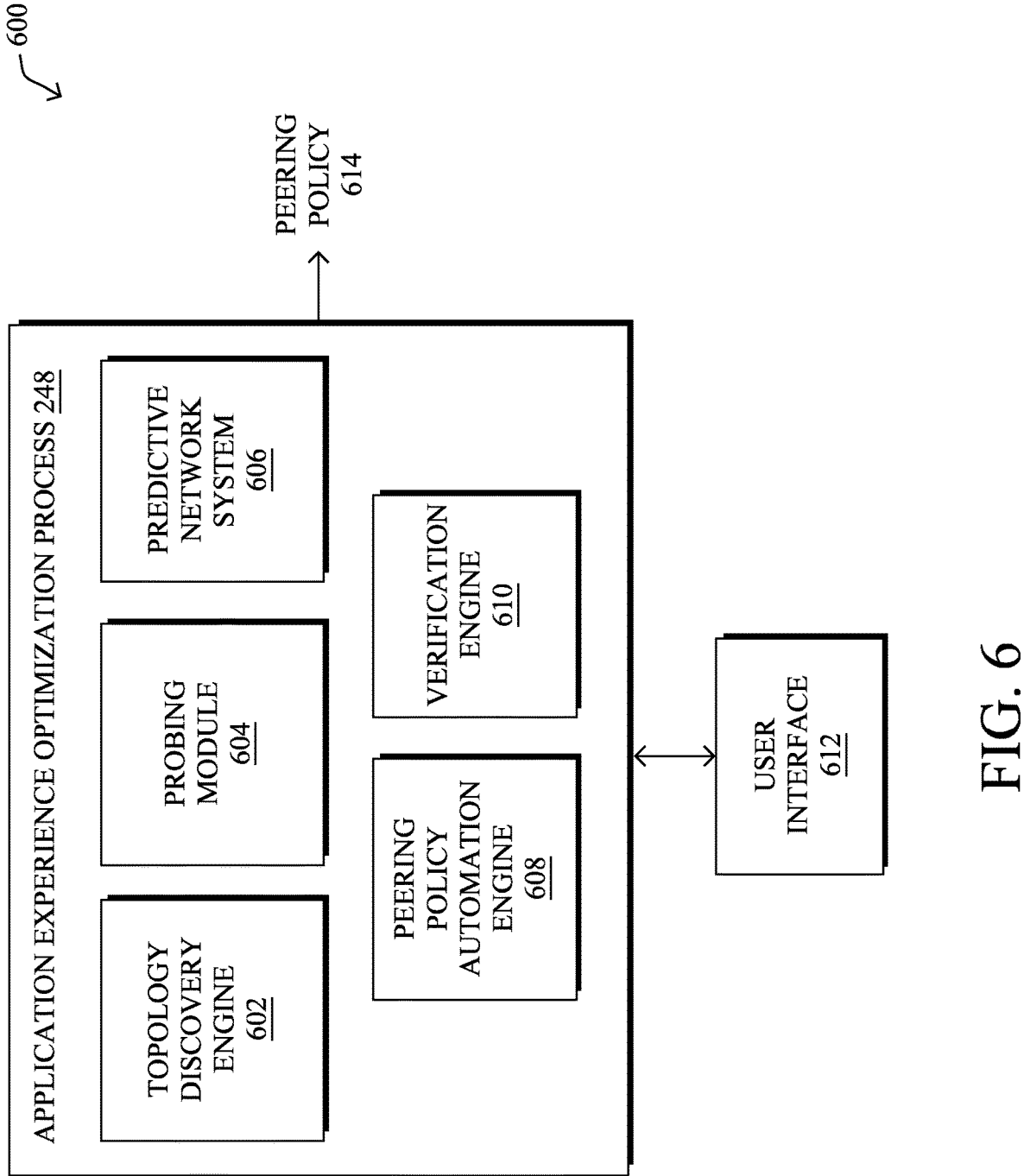
FIG. 6 illustrates an example architecture for predictive BGP peering.

Operationally, FIG. 6 illustrates an example architecture 600 for predictive BGP peering, according to various embodiments. At the core of architecture 600 is application experience optimization process 248, which may be executed by a controller for a network, a networking device, or another device in communication therewith. For instance, application experience optimization process 248 may be executed by a controller for a network, a particular networking device in the network (e.g., a router, etc.), another device or service in communication therewith, or any other device in a network.

As shown, application experience optimization process 248 may include any or all of the following components: topology discovery engine 602, probing module 604, predictive networking system 606, peering policy automation engine 608, and/or verification engine 610. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

In various embodiments, the role of topology discovery engine 602 is to collect telemetry from various sources, such as BGP route information, flow data (e.g., Netflow), device and interface utilization (SNMP, MDT), etc., and generate a mapping between remote destination (prefixes) and available peering connections. To do so, topology discovery engine 602 may begin by reviewing BGP configurations from routers in the ISP networks, to identify their external BGP peering partners based on the remote AS number and type of BGP session (eBGP vs iBGP). Topology discovery engine 602 could also determine further details around the nature of the BGP peering relationship (e.g., Upstream/ Transit Provider, Private Peering, IX Peering, Customer) by using a set of heuristics based on the routing information advertised by and towards each BGP peer. For example, a peer that advertises the global BGP Full Table towards the ISP and towards which the ISP only advertises its own prefixes (and the ones of its customers) can be classified as an Upstream Provider. In another instance, topology discovery engine 602 may classify a BGP session where only prefixes originated in each of the partners AS number as a Private Peering.

In a second step, topology discovery engine 602 may also utilize forwarding table content from each device to determine the association between the different BGP peers and the underlining physical layer (interfaces). It may also use information collected via means of SNMP or Model Driven Telemetry (MDT) to add further context about the capacity and utilization of each peering connection.

Next, topology discovery engine 602 may use the contents of the BGP routing to determine how remote destinations (IP prefixes) are mapped to the previously identified peering points. In most cases, reachability information about each destination is advertised by multiple peering partners, meaning that multiple alternate paths are available. Topology discovery engine 602 may also record BGP attributes such as Local Preference, multi-exit discriminator (MED), route weights, etc., for each path alongside information about the paths length (number of transits ASNs) and stability (number of route flaps).

Finally, topology discovery engine 602 may also obtain flow telemetry (Netflow, IPFIX, c/sFlow) is on-the-fly, to determine the volume of sent and received traffic associated with each remote destination over the various peering connection. Note also that the scope of the functionality herein is not limited to the volume of traffic but also the nature of the traffic. For instance, application experience optimization process 248 may activate BGP routing recommendations/ policy changes based on the volume of traffic and the type of applications (e.g. gaming traffic requiring more optimal paths, etc.).

Topology discovery engine 602 may perform these tasks on a continuous basis and update its resulting topology graphs with any changes that may occur or upon detecting a change such as a routing update, change of measured QoE for a given destination/type of traffic, etc.

Figure 7:
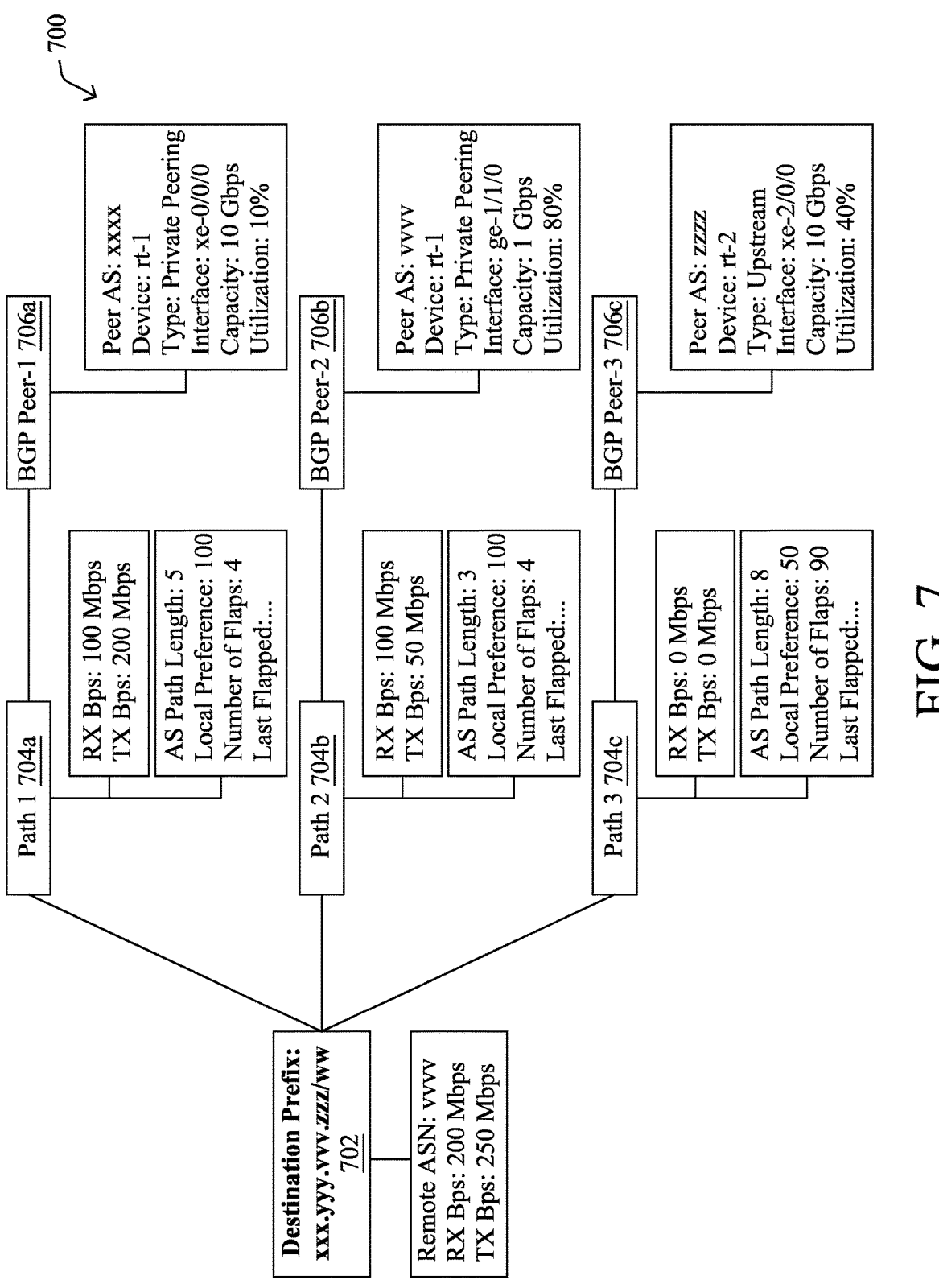
FIG. 7 illustrates an example visualization of a discovered network topology.

FIG. 7 illustrates an example visualization of a network topology 700 discovered by topology discovery engine 602, in some embodiments. As shown, for a given destination 702, topology discovery engine 602 may identify the various paths 704a-704c via the different BGP peers 706a-706c in the network. Associated with given destination 702 may be information such as its ASN, receive and/or transmit bitrates, etc. Associated with paths 704a-704c may also be collected information such as their receive and/or transmit bitrates, AS path lengths, Local Preference attributes, number of flaps, Finally, each peer 706a-706c may have associated information such as peer AS, device number, type, interface, capacity, utilization, or the like.

Referring again to FIG. 6, probing module 604 may be configured to dynamically configure performance monitoring of path performance metrics (e.g., loss, latency, jitter, throughput, etc.) for destinations of interest over each available peering path. To this end, probing module 604 may take as input the data produced by topology discovery engine 602 and select the destinations of interest based on traffic volume (top remote destinations by traffic volume). In one embodiment, a network administrator may also provide feedback regarding additional remote prefixes/destinations of interest via a user interface 612.

Probing module 604 may leverage any number of mechanisms in the network to collect the path performance telemetry, based on the capabilities of the underlining network devices. In some cases, mechanism such as IP SLA ICMP or HTTP Probes may be used, while in some others, a dedicated probing agent such as the ones provided by Thousand Eyes may be more convenient. As the overall network topology evolves over time, new BGP peers are added or removed, or traffic patterns shift, and new destinations of interest may appear, probing module 604 may also automatically adjust the probing configuration to add new probes or remove probes that are no longer necessary.

In various embodiments, predictive networking system 606 may take as input the topology output of topology discovery engine 602 which contains the information about the available paths for each destination of interest, as well as the network performance telemetry collected by probing module 604 for each of those paths and forecasts network quality issues (e.g., degradations of loss, delay, jitter, etc.) for each monitored destination and issues recommendations as to how they can be avoided.

More specifically, predictive networking system 606 may forecast network quality issues as a probability of SLA violation for each of the monitored L3 KPIs (e.g., loss, latency and jitter) against a set of predefined thresholds. Multiple options may be used to define the appropriate SLA thresholds, in one case a network administrator may provide this information based on previous knowledge via user interface 612. In another case, predictive networking system 606 may use statistical analysis of past path performance to dynamically define smart SLA thresholds that can account for the specificities of each destination prefix.

Figure 8:
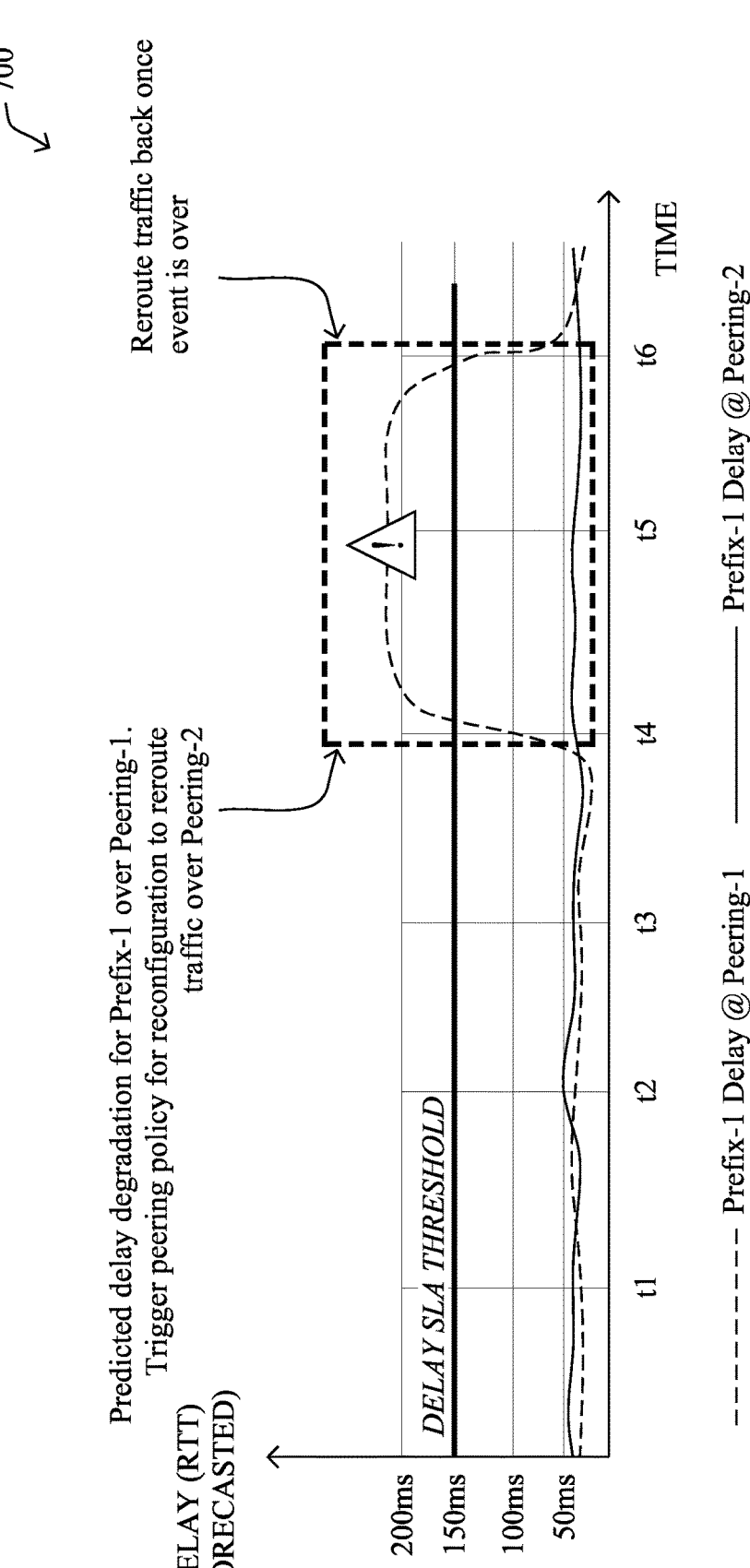
FIG. 8 illustrates an example plot showing a prediction-based recommendation.

Such recommendations could take the following form: "Delay for Prefix-A over Peering Point-1 increases significantly everyday between 16:00 and 21:00. Traffic can be re-routed via Peering Point-2 during this interval to avoid degradations." For instance, as shown in plot 800 in FIG. 8, assume that predictive network system 606 predicts the round trip time (RTT) delay for two peering paths to a certain destination (e.g., Prefix-1). Here, predictive network system 606 may predict that the first path will violate the delay SLA for is associated application during a time period t4-t6, but that the other path will not. In such a case, predictive network system 606 may trigger a peering policy change by policy automation engine 608 to instead proactively reroute the traffic via the second path and then revert to using the first path, once the event is over.

Referring again to FIG. 6, in various embodiments, policy automation engine 608 may take as input the routing recommendations produced by predictive network system 606 and determine the appropriate configuration changes required to BGP peering policies to implement them. To achieve the desired outcome, peering policy automation engine 608 may employ a range of different techniques to engineer egress or ingress traffic paths over specific peering points. In various embodiments, such actions may consist in manipulating the values of BGP attributes such as Local Preference or route Weight (e.g., when egress traffic engineering is required) or manipulating MED or the length of the AS Path (path prepend) (e.g., to influence the path of ingress traffic).

ISPs make use of extensive BGP policies to manage the peering infrastructure which are often distributed between multiple routers and applied to tens or hundreds of different peers. The risk tolerance for mistakes in such environments is low and changes much be carefully validated before being applied to the network to minimize misconfiguration risks. To this purpose, peering policy automation engine 608 may build a virtual copy of the BGP control plane based on routing and policy data collected from the live network and use it simulate the outcome of any changes prior to applying them, in one embodiment. Once the changes pass this validation step, they can be deployed to the network.

Peering policy automation engine 608 may then push the peering policy 614 changes to the network, such as via an already deployed network controller or by directly interfacing with the network devices via CLI, Netconf, or API interfaces.

For example, consider the task of engineering the outgoing traffic from ISP 502*a* in FIG. 5. Here, routers B1 and B2 are eBGP peers peering with ISP 502*b* and ISP 502*c*, respectively. Now, consider the case of Prefix-1 (P1) (i.e., destination 504*a*): in contrast with existing techniques where BGP parameters such as Local-Pref are set manually (and reactively), B1 and B2 may instead to get recommendations from predictive network system 606 to set their Local-Pref according to prediction, so as to influence the traffic sent from devices within ISP 502*a* and destined to destination 504*a*. Similarly, predictive network system 606 could use other techniques such as AS Path prepending, MED, or the BGP Communities published by the peer ASNs to influence the traffic destined to prefixes advertised by B1 and B2 from ISP 502*b* and ISP 502*c*.

In various embodiments, predictive network system 606 may govern these decisions using a combination of traffic telemetry (e.g., NetFlow, IPFIX), active probing (e.g., ThousandEyes tests, traceroutes, ICMP echo, BFD), and/or application feedback (e.g., user ratings, L7 telemetry) for both paths 506*a*-506*b*, to predict the peer that is most likely to provide a better experience in the future.

As an example, assume that up to 2.5 Gbps traffic is currently routed via path 506*a* to a prefix 12.23.34.16/24. Then, based on historical data, predictive network system 606 predicts the quality for path 506*a*, along with its uncertainty. It also predicts the expected quality and its uncertainty for path 506*b*, given the amount and nature of traffic currently flowing through path 506*a*. Now, by comparing both predictions, peering policy automation engine 608 may decide to set a different Local-Pref. The same can be done for return traffic, which would then be actioned via the techniques previously mentioned.

Note that the biggest challenge of predictive network system 606 is to predict the would-be performance of a path for which little or no historical data are available. For instance, if path 506*b* has never been used to route traffic to 12.23.34.16/24 or never in such quantities, then predictive network system 606 needs to perform an educated guess based on probes, performance of the peer for other "similar" prefixes (i.e., which share many hops with path 506*b*) or for other ASes routing traffic via this peer to the same prefix, or extrapolation based on past records for lower bitrates, if available.

Such an educated guess is necessarily less accurate and confident than a prediction based on direct historical data, which is why it is so critical that predictions are accompanied by uncertainty estimates, and those govern the decisions of peering policy automation engine 608. Traffic must be switched if and only if the difference in expected quality is significantly larger than the uncertainty of the underlying predictions.

In another embodiment, predictive network system 606 may predict the amount of traffic that would potentially be rerouted onto a different path after the change of the Local-pref attribute. Indeed, upon setting the Local-Pref attribute, all iBGP peers would start selecting a new ASBR to send their traffic for the corresponding prefix. Thus, predictive network system 606 may also consider the existing traffic routed via B2 in addition to the traffic rerouted via B2 for the prefix for which the Local-pref will be adjusted, and then make a prediction for the expected QoE of that traffic. In yet another embodiment, predictive network system 606 may trigger some traffic load balancing for the traffic by tuning the Local-pref to be equal for a given prefix for B1 and B2 (a configuration that is allowed). Needless to say, predictive network system 606 could also take a similar approach for engineering the traffic that is entering the AS using the AS path prepend, BGP MED, or BGP communities published by remote peers.

As shown in FIG. 6, verification engine 610 may keep track of the applied recommendations and monitoring network and application-level conditions to determine the outcome of implementing predictive network system 606 recommendations. Should the recommendation result have in a negative impact, such as degradation of performance metrics the system, verification engine 610 may take action to revert the change.

Finally, application experience optimization process 248 may provide various displays to user interface 612 to allow a network administrator to monitor (and control) operations of the system. For instance, user interface 612 may provide information for display regarding the discovered peering topology, distribution of traffic over the various peering connections, as well as the different routing recommendations produced by predictive network system 606, peering policy 614, and their associated predicted and measured performance. A notification system can also be employed to notify the user when new recommendations are available. Moreover, user interface 612 may also show the effect of implementing BGP configuration changes (before and after) by reporting the networking performance, before and after the changes are implemented (e.g., percentage of traffic of interest having violated SLAs, etc.).

Figure 9:
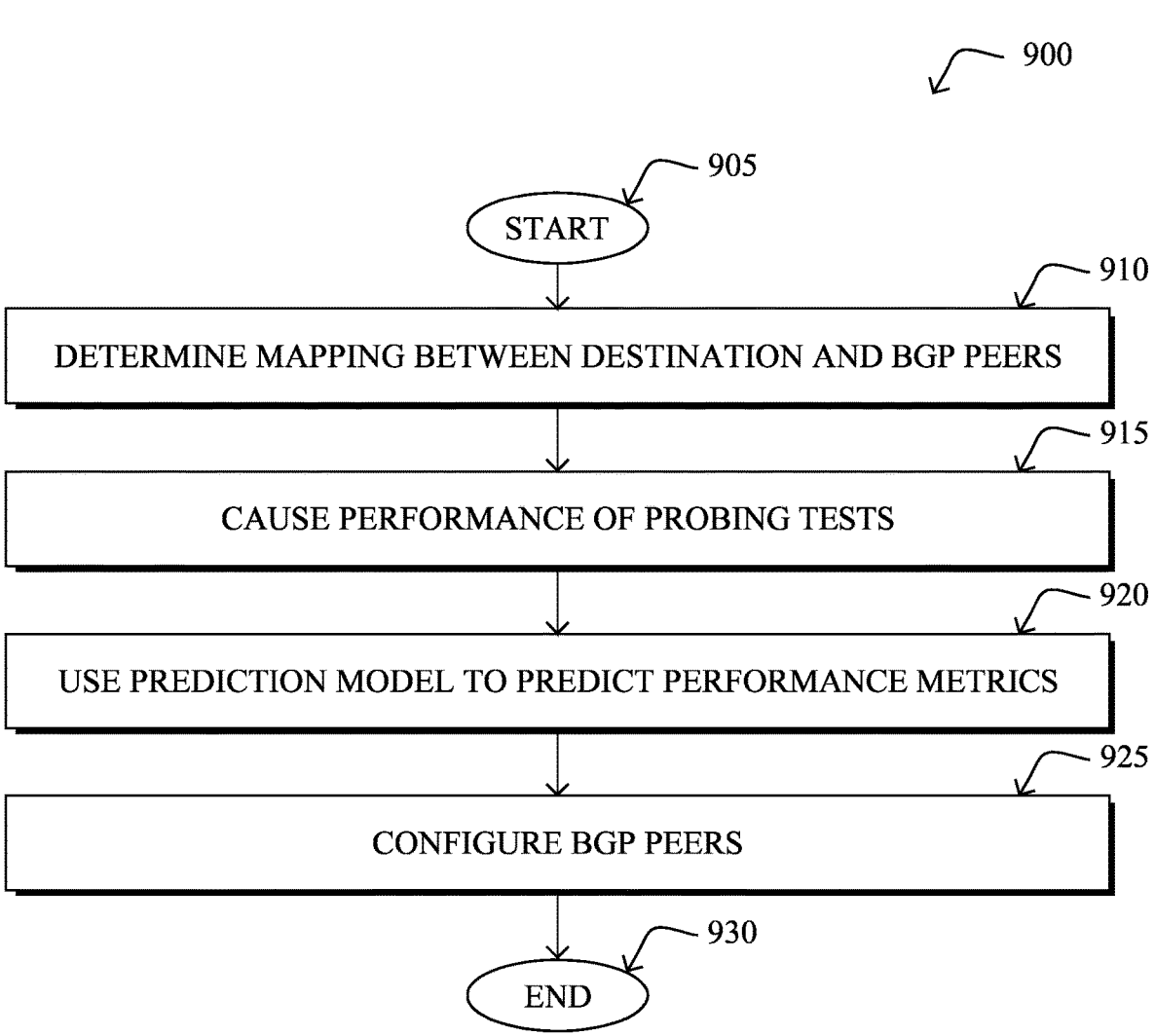
FIG. 9 illustrates an example simplified procedure for predictive BGP peering.

FIG. 9 illustrates an example simplified procedure 900 (e.g., a method) for predictive BGP peering, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 900 by executing stored instructions (e.g., application experience optimization process 248). The procedure 900 may start at step 905, and continues to step 910, where, as described in greater detail above, the device may determine a mapping between a network destination and BGP peers located across a plurality of autonomous systems for which the network destination is reachable. In various embodiments, the network destination is associated with an online application. In some embodiments, the network destination comprises an Internet Protocol (IP) prefix. In one embodiment, the device determines the mapping based on Border Gateway Protocol routing information advertised by the Border Gateway Protocol peers.

At step 915, as detailed above, the device may cause, based on the mapping, performance of probing tests along a plurality of paths to the network destination and via the BGP peers, to obtain path performance measurements for the plurality of paths. For instance, such probing tests may send ICMP probes, HTTP probes, or the like, along the paths, to measure the packet loss, jitter, delay, throughput, or the like, of the path.

At step 920, the device may use a prediction model to generate predicted performance metrics for the plurality of paths based on the path performance measurements, as described in greater detail above. In some embodiments, the predicted performance metrics indicate that a current path to the network destination will violate a service level agreement (SLA) for the online application. In further embodiments, the device may also obtain quality of experience data from the online application, whereby the prediction model generates the predicted performance metrics based in part on the quality of experience data.

At step 925, as detailed above, the device may configure, based on the predicted performance metrics for the plurality of paths, the BGP peers with BGP peering policies to convey application traffic associated with the network destination via particular path from among the plurality of paths. In some embodiments, the BGP peering policies adjust a BGP local preference attribute or route weight attribute, to cause the BGP peers to favor the particular path. In further embodiments, the BGP peering policies adjust a multi-exit discriminator or path length attribute, to cause the BGP peers to favor the particular path. In one embodiment, the device may also revert the Border Gateway Protocol peering policies, based on a determination that the predicted performance metrics for the particular path were incorrect. In an additional embodiment, the device may provide information regarding the mapping, the predicted performance metrics, and the particular path to a user interface.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for predictive BGP peering, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
determining, by a device, a mapping between a network destination and Border Gateway Protocol peers located across a plurality of autonomous systems for which the network destination is reachable;
causing, by the device and based on the mapping, performance of probing tests along a plurality of paths to the network destination and via the Border Gateway Protocol peers, to obtain path performance measurements for the plurality of paths;
using, by the device, a prediction model to generate predicted performance metrics and corresponding uncertainty estimates for the plurality of paths based on the path performance measurements; and
configuring, by the device and based on the predicted performance metrics and the corresponding uncertainty estimates for the plurality of paths, the Border Gateway Protocol peers with Border Gateway Protocol peering policies to convey application traffic associated with the network destination via a particular path from among the plurality of paths, wherein the particular path is selected based on a comparison of a predicted performance metric improvement associated with conveying the application traffic via the particular path, considering a corresponding uncertainty estimate for the predicted performance metric improvement, relative to another path.

2. The method as in claim 1, wherein the network destination is associated with an online application.

3. The method as in claim 2, wherein the predicted performance metrics indicate that a current path to the network destination will violate a service level agreement (SLA) for the online application.

4. The method as in claim 2, further comprising:
obtaining quality of experience data from the online application, wherein the prediction model generates the predicted performance metrics based in part on the quality of experience data.

5. The method as in claim 1, wherein the Border Gateway Protocol peering policies adjust a Border Gateway Protocol local preference attribute or route weight attribute, to cause the Border Gateway Protocol peers to favor the particular path.

6. The method as in claim 1, wherein the Border Gateway Protocol peering policies adjust a multi-exit discriminator or path length attribute, to cause the Border Gateway Protocol peers to favor the particular path.

7. The method as in claim 1, wherein the network destination comprises an Internet Protocol (IP) prefix.

8. The method as in claim 1, further comprising:
reverting the Border Gateway Protocol peering policies, based on a determination that the predicted performance metrics for the particular path were incorrect.

9. The method as in claim 1, further comprising:
providing information regarding the mapping, the predicted performance metrics, and the particular path to a user interface.

10. The method as in claim 1, wherein the device determines the mapping based on Border Gateway Protocol routing information advertised by the Border Gateway Protocol peers.

11. An apparatus, comprising:

one or more network interfaces;

a processor coupled to the one or more network interfaces and configured to execute one or more processes; and a memory configured to store a process that is executable by the processor, the process when executed configured to:

determine a mapping between a network destination and Border Gateway Protocol peers located across a plurality of autonomous systems for which the network destination is reachable;

cause, based on the mapping, a performance of probing tests along a plurality of paths to the network destination and via the Border Gateway Protocol peers, to obtain path performance measurements for the plurality of paths;

use a prediction model to generate predicted performance metrics and corresponding uncertainty estimates for the plurality of paths based on the path performance measurements; and configure, based on the predicted performance metrics and the corresponding uncertainty estimates for the plurality of paths, the Border Gateway Protocol peers with Border Gateway Protocol peering policies to convey application traffic associated with the network destination via a particular path from among the plurality of paths, wherein the particular path is selected based on a comparison of a predicted performance metric improvement associated with conveying the application traffic via the particular path, considering a corresponding uncertainty estimate for the predicted performance metric improvement, relative to another path.

12. The apparatus as in claim 11, wherein the network destination is associated with an online application.

13. The apparatus as in claim 12, wherein the predicted performance metrics indicate that a current path to the network destination will violate a service level agreement (SLA) for the online application.

14. The apparatus as in claim 12, wherein the process when executed is further configured to:

obtain quality of experience data from the online application, wherein the prediction model generates the predicted performance metrics based in part on the quality of experience data.

15. The apparatus as in claim 11, wherein the Border Gateway Protocol peering policies adjust a Border Gateway Protocol local preference attribute or route weight attribute, to cause the Border Gateway Protocol peers to favor the particular path.

16. The apparatus as in claim 11, wherein the Border Gateway Protocol peering policies adjust a multi-exit discriminator or path length attribute, to cause the Border Gateway Protocol peers to favor the particular path.

17. The apparatus as in claim 11, wherein the network destination comprises an Internet Protocol (IP) prefix.

18. The apparatus as in claim 11, wherein the process when executed is further configured to:

revert the Border Gateway Protocol peering policies, based on a determination that the predicted performance metrics for the particular path were incorrect.

19. The apparatus as in claim 11, wherein the process when executed is further configured to:

provide information regarding the mapping, the predicted performance metrics, and the particular path to a user interface.

20. A tangible, non-transitory, computer-readable medium storing program instructions that cause a device to execute a process comprising:

determining, by the device, a mapping between a network destination and Border Gateway Protocol peers located across a plurality of autonomous systems for which the network destination is reachable;

causing, by the device and based on the mapping, performance of probing tests along a plurality of paths to the network destination and via the Border Gateway Protocol peers, to obtain path performance measurements for the plurality of paths;

using, by the device, a prediction model to generate predicted performance metrics and corresponding uncertainty estimates for the plurality of paths based on the path performance measurements; and configuring, by the device and based on the predicted performance metrics and the corresponding uncertainty estimates for the plurality of paths, the Border Gateway Protocol peers with Border Gateway Protocol peering policies to convey application traffic associated with the network destination via a particular path from among the plurality of paths, wherein the particular path is selected based on a comparison of a predicted performance metric improvement associated with conveying the application traffic via the particular path, considering a corresponding uncertainty estimate for the predicted performance metric improvement, relative to another path.

* * * * *